United States Patent [19]

Lu et al.

[11] Patent Number: 5,178,124
[45] Date of Patent: Jan. 12, 1993

[54] PLASTIC SECONDARY HEAT EXCHANGER APPARATUS FOR A HIGH EFFICIENCY CONDENSING FURNACE

[75] Inventors: Lin-Tao Lu; Ali Shenasa, both of Fort Smith; Diane M. Jakobs, Alma; Gallen W. Stokes, Fort Smith, all of Ark.

[73] Assignee: Rheem Manufacturing Company, New York, N.Y.

[21] Appl. No.: 744,076
[22] Filed: Aug. 12, 1991
[51] Int. Cl.$^5$ ............................................. F24H 3/10
[52] U.S. Cl. ................... 126/110 R; 165/170; 165/171; 165/176; 165/178
[58] Field of Search .......... 126/116 R, 110 R, 99 R; 165/170, 171, 176, 178, 177

[56] References Cited

U.S. PATENT DOCUMENTS

| | | | |
|---|---|---|---|
| 2,151,590 | 3/1939 | Varga | 165/178 X |
| 2,504,315 | 4/1950 | Feuerfile | 126/110 R |
| 2,573,161 | 10/1951 | Tadewald | 165/178 X |
| 3,102,530 | 9/1963 | Diehl | 126/99 R |
| 3,294,082 | 12/1966 | Norris | 126/116 |
| 3,800,868 | 4/1974 | Berkowitz et al. | 165/170 |
| 4,217,887 | 8/1980 | Hoffman et al. | 126/448 |
| 4,265,225 | 5/1981 | Berger et al. | 126/448 X |
| 4,314,605 | 2/1982 | Sumitomo et al. | 165/166 X |
| 4,434,112 | 2/1984 | Pollock | 165/177 X |
| 4,561,421 | 12/1985 | Hwang et al. | 126/110 R |
| 4,600,052 | 9/1986 | Wood, III et al. | 165/178 R |
| 4,693,302 | 9/1987 | Dodds | 165/170 R |
| 4,708,197 | 11/1987 | Robbins | 165/54 |
| 4,794,983 | 1/1989 | Yoshida et al. | 165/133 |
| 4,807,588 | 2/1989 | Bentley et al. | 126/110 R |
| 4,819,586 | 4/1989 | Kreuter | 165/177 X |
| 4,848,314 | 7/1989 | Bentley | 126/116 R |
| 4,860,725 | 8/1989 | Tallmane et al. | 126/116 R X |
| 4,898,153 | 2/1990 | Sherwood | 165/176 X |
| 4,907,648 | 3/1990 | Emmerich et al. | 165/166 |
| 4,923,004 | 5/1990 | Fletcher et al. | 165/175 |
| 4,955,435 | 9/1990 | Shuster et al. | 165/170 |

FOREIGN PATENT DOCUMENTS

| | | | |
|---|---|---|---|
| 207802 | 9/1955 | Australia | 165/178 |
| 897785 | 10/1953 | Fed. Rep. of Germany | 165/178 |
| 571453 | 3/1924 | France | 165/171 |
| 0188943 | 11/1982 | Japan | 165/178 |
| 0208497 | 9/1986 | Japan | 165/176 |
| 2078361 | 1/1982 | United Kingdom | 165/176 |

OTHER PUBLICATIONS

J. Redman, Non-Metallic Heat Exchangers. The Chemical Engineer, No. 17, pp. 17–26, Apr., 1989.
D. M. Bigg, G. H. Stickford and S. G. Falbert–Application of Polymeric Materials for Condensing Heat Exchangers.
B. S. Morra and S. R. Plucinsky–High Temperature Engineering Plastics for Use in Condensing Heat Exchangers.
F. Preto et al–Development and Performance of a High Efficiency Gas-Fired Furance Equipped with a Plastic Condensing Heat Exchanger.

*Primary Examiner*—Carl D. Price
*Attorney, Agent, or Firm*—Konneker & Bush

[57] ABSTRACT

A high efficiency fuel-fired condensing furnace is provided with a compact recuperative heat exchanger structure comprising a metal primary heat exchanger positioned above and operatively connected to the inlet side of a secondary heat exchanger formed from a polyetherimide (PEI) plastic material. The primary heat exchanger is formed from a horizontally spaced series of vertically serpentined metal combustor tubes, and the second heat exchanger if formed from horizontally spaced apart injection molded inlet and outlet collector boxes interconnected by a horizontally spaced series of elongated hollow extruded plate members sealingly secured at their opposite ends to the collector boxes with the side edge-to-side edge widths of the hollow plate members being vertically oriented. The outlet ends of the metal tubes are operatively connected to the plastic inlet collector box. Cross-sectionally along their lengths, the hollow plastic plate members have horizontally flattened portions interdigitated with horizontally enlarged, convexly curved poritons. Various heat transfer-enhancing alternate embodiments of the hollow plate members are disclosed. Additionally disclosed is an alternate embodiment of the plastic secondary heat exchanger in which the inlet collector box is positioned atop the outlet collector box, and the hollow plate members are internally baffled in a manner causing combustion gas exiting the inlet collector box to make two passes through the hollow plate members before entering the outlet collector box.

24 Claims, 5 Drawing Sheets

PLASTIC SECONDARY HEAT EXCHANGER APPARATUS FOR A HIGH EFFICIENCY CONDENSING FURNACE

BACKGROUND OF THE INVENTION

The present invention relates generally to heat transfer apparatus, and more particularly relates to heat exchangers used in fuel-fired, forced air condensing furnaces.

With the growing need to improve the overall energy efficiency of fuel-fired, forced air heating furnaces, considerable design effort has been directed toward increasing the combustion gas-to-supply air heat transfer capability of their heat exchanger components. Traditionally, fuel-fired forced air heating furnaces have been provided with metal heat exchangers designed to extract only sensible heat from the combustion gases passing therethrough, and transfer the extracted sensible heat to the air being forced externally across the heat exchanger.

Because only sensible heat is withdrawn from the combustion gases, no appreciable amount of condensation of the combustion gases occurs within the heat exchanger during furnace operation. This mode of heat transfer is commonly referred to as a "dry" or "nonrecuperative" process. The combustion gases exiting the heat exchanger, and discharged to atmosphere through a vent stack, are typically quite hot due to the appreciable amount of latent heat remaining therein. Accordingly, a considerable amount of available combustion air heat is simply dumped to ambient, and the overall heat transfer efficiency Of nonrecuperative heat exchangers is generally limited to about 85%.

To capture otherwise wasted latent combustion gas heat, recuperative or "condensing" type heat exchanger structures have been used in which a secondary or "wet" heat exchanger is connected in series with the primary or dry heat exchanger at its discharge side. During furnace operation, the primary heat exchanger performs its usual task of extracting sensible heat from the combustion gases internally traversing it, and the secondary heat exchanger operates to extract primarily latent heat from the combustion gases, thereby considerably lowering the temperature of the gases ultimately discharged into the vent stack. The use of condensing type primary/secondary heat exchanger of this type potentially raises the overall heat exchanger thermal efficiency to about 95%.

However, the corrosively acidic character of combustion gas condensate formed in the secondary heat exchanger (typically drained away via a condensate discharge conduit connected thereto) during furnace operation essentially precludes the construction of the secondary heat exchanger from the same ordinary metal used to form the dry process primary heat exchanger. Accordingly, various proposals have been made to form the secondary heat exchanger from stainless steel. It has been found, however, that even stainless steel is not entirely suitable, particularly in operating environments where the combustion gas condensate form hydrochloric acid. This particular corrosive attack problem may be to a large part overcome by using, for example, a stainless steel molybdenum alloy, but the high cost of this material makes it unsuitable for furnace heat exchanger applications.

Another material considered for use in the construction of the secondary heat exchanger portion of a recuperative heat exchanger of this type is plastic, and various types of plastic have been investigated and evaluated. For a variety of reasons, though, plastic secondary heat exchangers have not proven to be entirely satisfactory despite their typically high resistance to acidic corrosion.

For example, the construction of plastic heat exchangers has heretofore required complex manufacturing techniques entailing high tooling and assembly costs, a variety of secondary operations, and a relatively lengthy assembly time per unit. Additionally, compared to their metal counterparts, conventional plastic secondary heat exchangers have often been susceptible to thermal shock and have exhibited other undesirable structural weaknesses.

Moreover, due to the considerably lower heat transfer capability of plastic compared to metal, a plastic heat exchanger of conventional construction tends to be considerably larger than a corresponding metal heat exchanger of the same heat transfer capacity. Particularly in a furnace of an otherwise compact configuration, this is a decidedly undesirable characteristic. Attempts to construct plastic heat exchangers in a manner permitting them to occupy generally the same overall volume as their metal counterparts has typically resulted in an unacceptably high air pressure drop across the plastic heat exchanger.

From the foregoing, it can readily be seen that it would be highly desirable to provide an improved plastic secondary heat exchanger, for recuperative use with a metal primary heat exchanger in a condensing furnace, that eliminates or at least substantially reduces the above-mentioned problems, limitations and disadvantages heretofore associated with plastic heat exchangers in this general application. It is accordingly an object of the present invention to provide such an improved plastic heat exchanger.

SUMMARY OF THE INVENTION

In carrying out principles of the present invention, in accordance with a preferred embodiment thereof, a representative fuel-fired forced air condensing furnace is provided with a uniquely configured recuperative heat exchanger structure comprising a metal primary heat exchanger operatively connected to the inlet side of a plastic secondary heat exchanger.

The primary heat exchanger comprises a horizontally spaced series of vertically serpentined metal combustor tubes having inlet ends for receiving flames and hot products of combustion from the furnace burner system, and outlet ends for discharging hot combustion gases. The secondary heat exchanger is positioned beneath the primary heat exchanger, is preferably formed from a polyetherimide (PEI) plastic material, and includes an inlet collector box connected to the outlet ends of the metal tubes to receive combustion gases discharged therefrom. The inlet collector box is preferably of an injection molded plastic construction.

According to a feature of the present invention, a spaced series of outwardly projecting tubular connection members are formed on the inlet collector box. Means are provided for resiliently and sealingly joining the connection members to the outlet ends of the metal tubes in a manner compensating for the differences in thermal expansion and contraction between the metal and plastic portions at this juncture area, and permitting a "snap together" assembly technique to be used in joining the primary and secondary heat exchangers.

In one embodiment of these joining means, the outlet ends of the metal tubes are flared and are removably fitted over the tubular plastic connection members. The flared metal tube ends compress resilient O-ring seals fitted around the connection members outboard of annular external peripheral ribs formed thereon.

In another embodiment of the joining means, the flaring of the metal tube outlet ends, and the external connection member ribs, are eliminated, and the tube end and connection member pairs are positioned in end-to-end relationships. Annular rubber sealing collars are placed around the tube end and connection member pairs to sealingly and resiliently join them.

Spaced horizontally apart from the inlet collector box is a plastic outlet collector box, also preferably of an injection molded plastic construction. The outlet collector box is connected to the inlet of a draft inducer fan incorporated in the furnace. The interiors of the inlet and Outlet collector boxes are communicated by means of a horizontally spaced series of elongated, hollow plastic heat transfer members, preferably plastic extrusions, sealingly connected at their opposite ends to the inlet and outlet collector boxes.

The elongated, hollow heat transfer members have generally plate-like configurations, with the side edge-to-side edge widths of the heat transfer members being generally vertically disposed. In cross-section along its length, each of the hollow heat transfer members is preferably defined by a vertically spaced series of horizontally indented first portions interdigitated with a vertically spaced series of horizontally enlarged, convexly curved second portions.

During operation of the furnace, a blower forces air externally across the recuperative heat exchanger, in an upward direction, while burner flames and hot products of combustion are drawn into the inlet ends of the metal primary heat exchanger tubes by operation of the draft inducer fan. Hot gases generated by the combustion process are flowed through the metal tubes, and sensible combustion gas heat is transferred to the upwardly flowing air through such tubes.

The substantially cooled combustion gases entering the inlet collector box are drawn into the Outlet collector box via the hollow, plate-like heat transfer members and then discharged to ambient by the draft inducer fan. Latent heat (and some sensible heat) from the combustion gases is transferred to the upwardly flowing air through the secondary heat exchanger. Combustion gas condensate formed in the secondary heat exchanger is continuously removed therefrom by a suitable condensate drain line connected to the bottom of the outlet collector box.

In various alternate embodiments thereof, the heat transfer members are modified to enhance their combustion gas-to-air heat transfer efficiencies. For example, in a first alternative embodiment each of the heat transfer members is horizontally bent in alternating opposite directions along its length. A second alternate embodiment provides each of the heat transfer members with a longitudinally spaced series of inwardly projecting internal peripheral ribs.

In a third alternate embodiment of the heat transfer members, the horizontal width of the enlarged second portions of each of the members progressively decreases from the uppermost one to the lowermost one of the second portions in a manner such that nonparallel reference planes on opposite sides of the heat transfer members are generally tangent to the second portions thereof. The heat transfer members are relatively positioned in a manner such that the facing reference planes on each adjacent pair of the heat transfer members are generally parallel to one another so that the heat transfer members are collectively positioned in a generally fan-like orientation as viewed along their lengths.

In a fourth alternate embodiment thereof, the structural rigidity of the heat transfer members is increased by connecting the opposing wall sections of each of the horizontally indented first portions thereof with an internal stiffening rib section extending along the lengths of the opposing wall sections.

According to another aspect of the present invention, the plastic inlet collector box has a side wall with an interior surface in which a horizontally spaced series of downwardly sloping condensate drainage troughs are formed. Each of the troughs has a lower end portion aligned with one of the heat transfer member end portions and positioned to direct combustion gas condensate from the interior of the inlet collector box into the heat transfer member end portion. To facilitate the entry of combustion gas condensate into the troughs, the interior side wall surface portions adjacent the sides of the troughs are preferably sloped toward the trough sides.

In an alternate embodiment of the plastic secondary heat exchanger, the inlet collector box is positioned upwardly adjacent the outlet collector box, and each of the heat transfer members has an inner end portion and a closed outer end. Upper and lower sections of these inner end portions are respectively connected to the inlet and outlet collector boxes, and internal baffles separate upper sections of the heat transfer members from lower sections thereof except along longitudinal portion of the heat transfer members adjacent their closed outer ends.

The baffles operate in a manner such that combustion gases operatively traversing the secondary heat exchanger sequentially enter the inlet collector box, flow through the upper sections of the heat transfer members toward the closed outer ends thereof, pass into the lower sections of the heat transfer members adjacent the closed outer ends thereof, and then flow through the lower sections of the heat transfer members into the outlet collector box.

The plastic secondary heat exchanger of the present invention provides a variety of advantages over plastic secondary heat exchangers of conventional construction including lowered fabrication costs, improved mechanical strength, reduced air pressure drop, decreased physical size, and enhanced heat transfer efficiency. Coupled with the uniquely configured metal primary heat exchanger, the plastic secondary heat exchanger of the present invention is seen to provide a significant heat exchange improvement for fuel-fired, forced air condensing furnaces.

DETAILED DESCRIPTION

Figure 1:
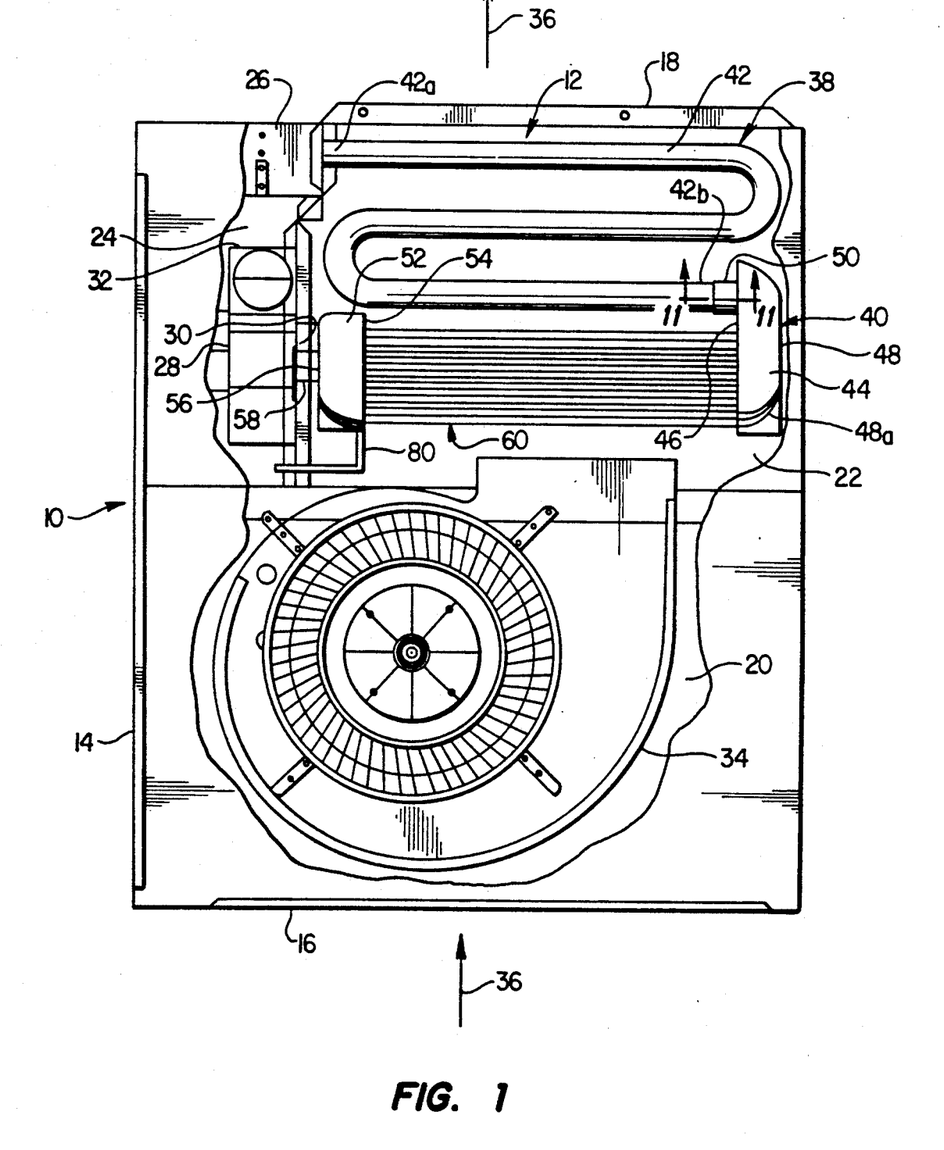
FIG. 1 is a partially cut away side elevational view of a representative forced air condensing furnace incorporating therein a specially designed metal primary/plastic secondary heat exchanger structure embodying principles of the present invention.

Illustrated in FIG. 1 is a fuel-fired forced air condensing furnace 10 that embodies principles Of the present invention and incorporates therein a specially designed recuperative heat exchanger structure 12. Furnace 10 has a rectangularly cross-sectioned metal housing 14 with an air inlet opening 16 formed in its bottom end, and an air discharge opening 18 formed in its top end. The interior of the housing is appropriately partitioned into a return air inlet plenum 20 positioned at the bottom of the housing and opening outwardly through inlet opening 16, an air heating flow passage 22 positioned above the plenum 20 and opening outwardly through the discharge opening 18, and a chamber 24 positioned above the plenum 20 to the left of the flow passage 22.

A fuel burner system 26 is positioned within an upper end portion of the chamber 24 and is conventionally operative to receive a fuel-air mixture and rightwardly discharge flames and hot products of combustion. Burner system 26 is positioned above a conventional draft inducer fan 28 also disposed within the chamber 24. Fan 28 has an inlet 30 for receiving combustion gases, and an outlet 32 for discharging the received gases into a suitable exhaust flue (not illustrated).

The improved recuperative heat exchanger structure 12 of the present invention is interposed within the air heating flow passage 22 between the housing discharge opening 18 and a centrifugal air supply blower 34 mounted within the return air inlet air plenum 20. In a manner subsequently described, the heat exchanger structure 12 operates to receive the flames and hot combustion products discharged by the burner system 26 and internally flow the resulting combustion gases to the draft inducer fan inlet 30. During operation of the furnace 10, the blower 34 draws air 36 into plenum 20 through the housing inlet opening 16, forces the air upwardly through the air heating flow passage 22 and externally across the heat exchanger structure 12 therein to heat the air, and then discharges the heated air 36 through the top housing opening 18.

Referring now to FIGS. and 2, the recuperative heat exchanger structure 12 comprises a metal primary heat exchanger 38 operative to transfer sensible combustion heat to the air 36, and a plastic secondary heat exchanger 40 positioned beneath the heat exchanger 38 and operative to transfer primarily latent combustion heat to the air 36. The primary heat exchanger 38 is defined by a horizontally spaced series of vertically serpentined metal tubes 42, some of which have been removed in FIG. 2 for purposes of illustrative clarity. Each of the metal tubes 42 has a leftwardly facing open inlet end $42_a$ positioned to receive flames and hot products of combustion discharged from the burner system 26, and a rightwardly facing open outlet end $42_b$ for discharging combustion gases into the secondary heat exchanger 40 as later described.

Figure 2:
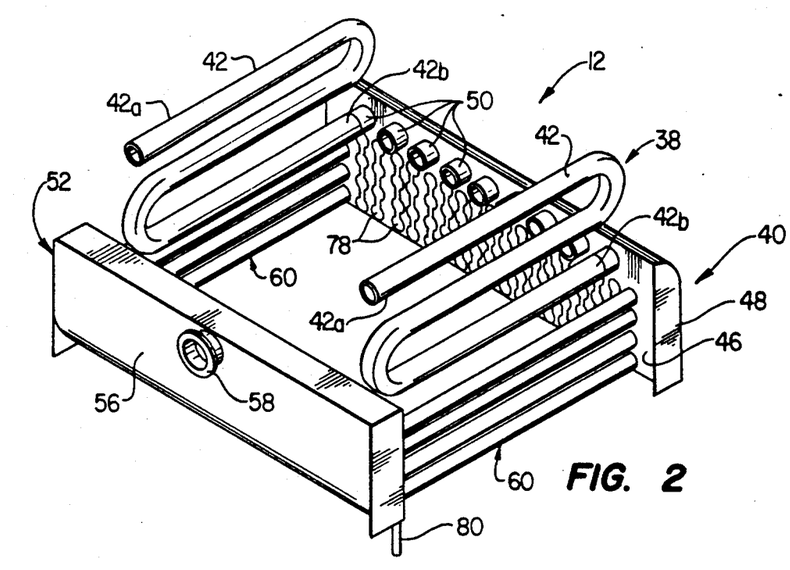
FIG. 2 is an enlarged scale perspective view of the heat exchanger structure removed from the furnace.
Figure 11:
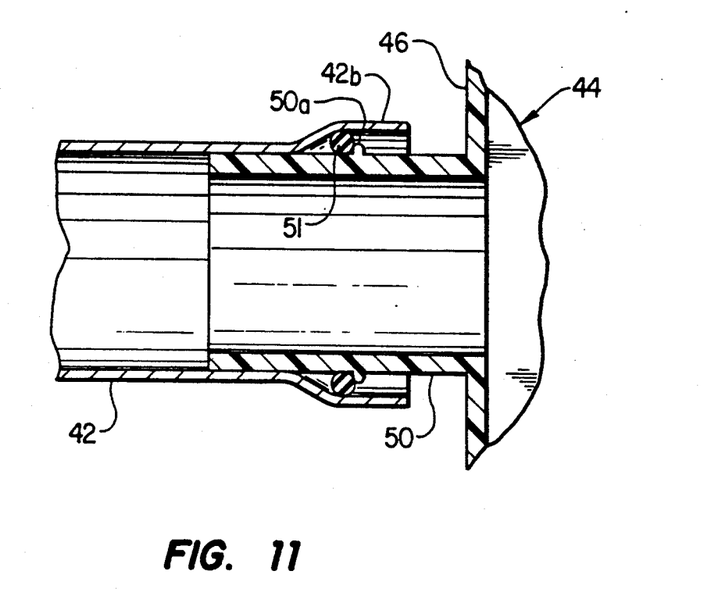
FIG. 11 is an enlarged scale cross-sectional view through a juncture area between the primary and secondary heat exchangers taken along line 11—11 of FIG. 1.

Secondary heat exchanger 40 is preferably formed from a polyetherimide (PEI) plastic material, although other suitable plastics could alternatively be used, and includes an inlet collector box 44 having, as viewed in FIGS. 1 and 2, a left side wall 46 and a right side wall 48. For purposes later described, wall 48 has a convexly curved lower portion $48_a$ that slopes downwardly and leftwardly. A horizontally spaced series of tubular connection members 50, each having an annular external peripheral rib $50_a$ formed thereon (see FIG. 4), project leftwardly from a top portion of the collector box side wall 46. As illustrated in FIG. 11, the open outlet ends $42_b$ of the metal tubes 42 are outwardly flared and receive the tubular connection members 50. Seals are formed between the metal tube ends $42_b$ and their associated connection members 50 by means of fluorocarbon elastomer O-ring seals 51 that circumscribe the connection members 50, outboard or their annular ribs $50_a$, and are compressed by the flared metal tube ends $42_b$.

This resilient sealing connection serves to compensate for the difference in expansion and contraction of the joined metal and plastic portions of the heat exchanger structure in heating and cooling cycles. It yields a leakproof connection while allowing the primary and secondary heat exchangers to expand and contract freely in both axial and radial directions, thereby substantially minimizing thermal stress buildup during the furnace operating cycle. This design provides for a "snap-in" assembly process, thereby significantly reducing the manufacturing cost of the overall recuperative heat exchanger structure.

Figure 11A:
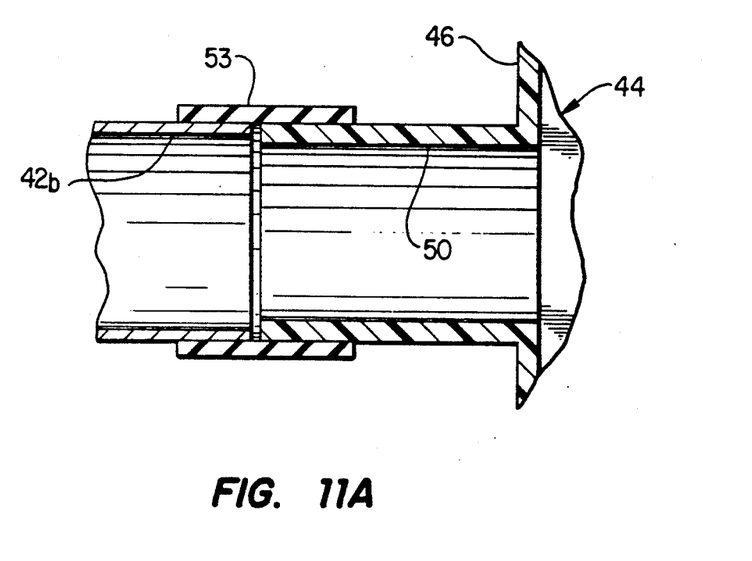
FIG. 11A is a cross-sectional view similar to that in FIG. 11 but illustrating an alternate configuration of the juncture area.

An alternate configuration of this resilient sealing connection between the primary and secondary heat exchangers is shown in FIG. 11A. In this connection embodiment, the flaring of the metal tube ends $42_b$ is eliminated, as are the annular ribs $50_a$ on the tubular plastic connection members 50. The associated pairs of tube ends and connection members $42_b$, 50 are instead positioned in an end-to-end orientation and resiliently and sealingly joined by a tubular rubber sealing collar 53 which outwardly circumscribes them. This sealing and connection method provides operating and construction advantages similar to that described in conjunction with FIG. 11.

The secondary heat exchanger 40 also includes an outlet collector box 52 spaced leftwardly apart from the inlet collector box 44 and positioned rightwardly adjacent the draft inducer fan 28. Collector box 52 has a right side wall 54 that faces the side wall 46 of collector box 44, and a left side wall 56. A cylindrical outlet collar 58 projects leftwardly from the side wall 56 and is operatively connected to the inlet 30 of the draft inducer fan 28. The inlet and outlet collector boxes 44 and 52 are each preferably of an injection molded plastic construction.

The interiors of the inlet and outlet collector boxes 44 and 52 are communicated by means of a horizontally spaced series of elongated hollow heat transfer members 60 longitudinally extending between the horizontally spaced collector boxes 44 and 52, some of the heat transfer members having been removed from FIG. 2 for purposes of illustrative clarity. Heat transfer members 60 are preferably plastic extrusions, have generally plate-like configurations, and are in a mutually parallel relationship with the side edge-to-side edge widths of the members being generally vertically oriented. For condensate drainage purposes later described, the hollow heat transfer members 60 are sloped slightly downwardly and leftwardly from the inlet collector box 44 to the outlet collector box 52.

Figure 3:
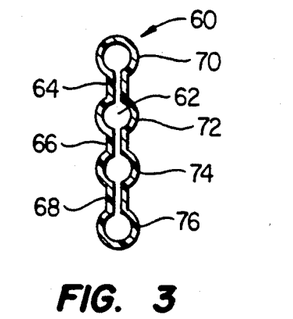
FIG. 3 is an enlarged scale cross-sectional view through one of the hollow plate sections of the plastic secondary heat exchanger portion of the structure taken along line 3—3 of FIG. 2.
Figure 4:
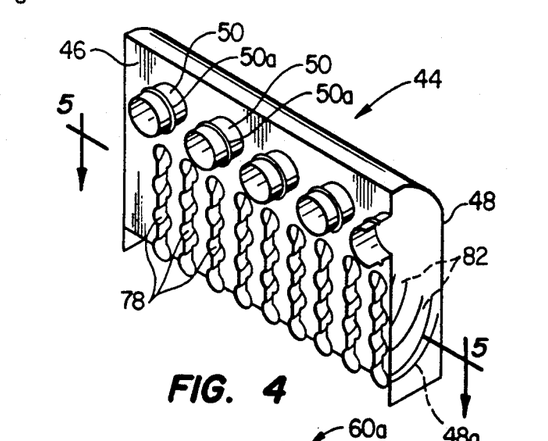
FIG. 4 is a partially cut away perspective view of an injection molded plastic inlet collector box portion of the secondary heat exchanger.

Referring now to FIGS. 3 and 4, each of the extruded plastic heat transfer members has, along its length, an internal flow passage 62, and a cross-section defined by a vertically spaced series of horizontally indented first portions 64,66 and 68 interdigitated with a vertically spaced series of horizontally enlarged, convexly curved second portions 70,72,74 and 76 having generally tubular shapes. Right end portions of the heat transfer members 60 extend into complementarily configured openings 78 formed in the inlet collector box side wall 46 and are sealingly secured therein by, for example, using an ultrasonic plastic welding process or a suitable epoxy material. In a like manner, left end portions of the heat transfer members extend into, and are sealingly secured within, similarly configured openings formed in the right side wall 54 (see FIG. 1) of the outlet collector box 52.

During furnace operation (FIG. 1), flames and hot products of combustion from the burner system 26 are drawn rightwardly into the open metal tube ends $42_a$. The resulting hot combustion gases then flow through the vertically serpentined combustor tubes 42 where they are progressively cooled due to sensible heat transfer therefrom to the air 36 flowing upwardly through the horizontally separated flow spaces between the plastic heat transfer members 60 and the metal tubes 42.

Combustion gases rightwardly discharged from the metal tube ends $42_b$, at approximately 400° F., enter the inlet collector box 44 and then flow leftwardly through the plastic heat transfer members 60 into the outlet collector box 52 after being further reduced in temperature by primarily latent heat transfer to the upwardly flowing air 36. Finally, the combustion gases, at a temperature of approximately 120° F., are discharged from the outlet collector box into the draft inducer fan inlet 30 and flowed into the exhaust flue.

Figure 5:
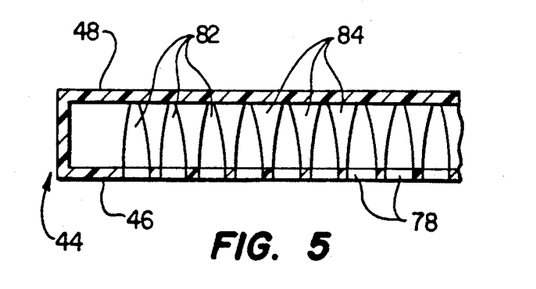
FIG. 5 is a cross-sectional view through the inlet collector box taken along line 5—5 of FIG. 4.

Condensate forming in the inlet collection box 44, along with condensate forming within the heat transfer members 60, is flowed leftwardly through the downwardly sloping heat transfer members into the outlet collector box 52 for drainage therefrom via a condensate drain line 80 connected to the bottom side of the outlet collector box (FIGS. 1 and 2). Referring now to FIGS. 4 and 5, retention of condensate within the interior of the inlet collector box 44 is essentially precluded by the formation of a horizontally spaced series of downwardly sloping drainage troughs 82 on the interior surface of the curved side wall portion $48_a$ of the inlet collector box.

The bottom ends of the troughs 82 are aligned with the bottom ends of the side wall openings 78, and thus with the right end portions of the heat transfer members 60 inserted therein. Accordingly, condensate forming within the inlet collector box enters the troughs 82 and flows by gravity therethrough into the right ends of the heat transfer members 60. To facilitate the entry of condensate from along the interior surface portions 84 (FIG. 5) disposed between the troughs 82, each of the interior surface portions 84 is appropriately sloped toward a side of an adjacent trough.

Because the lower ends of the troughs 82 are at the bottom of the inlet collector box, and aligned with the lower sides of the right end portions of the heat transfer members 60, even if the heat transfer members are incorrectly installed in a horizontal orientation (or even with a slight downward and rightward slope), the troughs 82 provide an outlet passage for condensate from the inlet collector box. Accordingly, condensate which might backflow rightwardly into the inlet collector box under some operating conditions is simply forced back into the heat transfer members 60 by new combustion gases entering the inlet collector box.

The recuperative heat exchanger structure 12 has a high heat transfer efficiency, and a relatively low air side pressure drop, despite the use of plastic in forming the secondary heat exchanger 40. Due to the compact configuration and arrangement of the extruded plastic heat transfer members 60, the secondary heat exchanger provides the requisite latent heat transfer without requiring either the relatively large size or high air pressure drop commonly associated with plastic secondary heat exchangers of conventional construction and configuration.

Additionally, compared to conventional plastic heat exchangers, the secondary heat exchanger 40 provides the advantages of high volume production rate at relatively low tooling costs, parts consolidation and relatively low assembly costs, and a modular design achieved simply by varying the number of the heat transfer members used in a particular heat exchanger. The relatively low air side pressure drop across the secondary heat exchanger, due to a reduced air flow separation and recirculation, also advantageously reduces the power consumption and noise level for the supply air blower.

Figure 6:
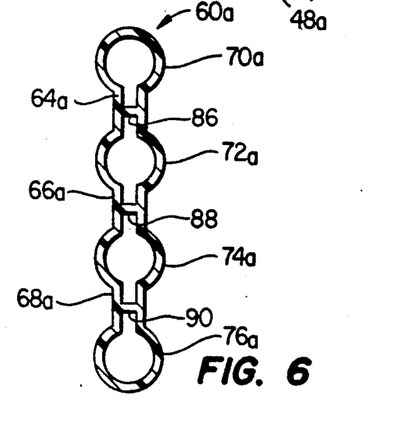
FIG. 6 is a cross-sectional view similar to that in FIG. 3, but illIlustrating an alternate cross-sectional configuration of the plastic secondary heat exchanger plate.

In accordance with other aspects of the present invention, the plastic heat transfer members 60 are given various alternative cross-sectional configurations which may be used in place of the previously described cross-sectional configuration of the extruded plastic heat transfer members 60. For example, the alternatively configured heat transfer member $60_a$ shown in FIG. 6 is provided with increased structural rigidity by interiorly interconnecting the facing side wall sections of its horizontally indented portions $64_a$, $66_a$ and $68_a$ with elongated stiffening ribs 86,88,90 that may be conveniently formed during the extrusion of the heat transfer member $60_a$.

Figure 7:
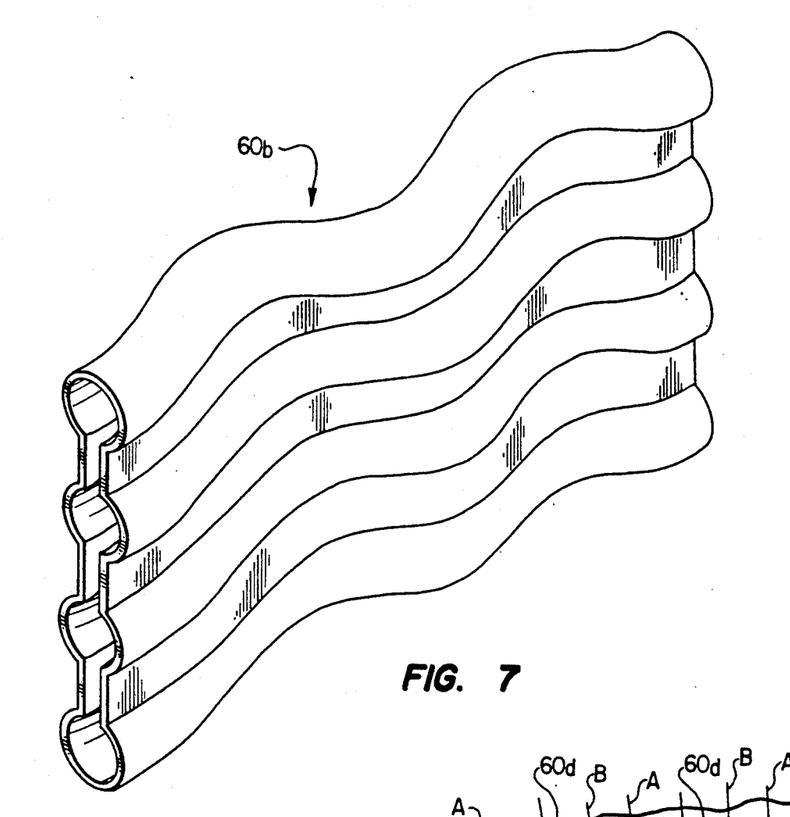
FIG. 7 is a perspective view of one of the plastic secondary heat exchanger plates illustrating a second alternate configuration thereof.

The heat transfer capacity of the alternatively configured heat transfer member $60_b$ illustrated in FIG. 7 is increased by forming the heat transfer member in a manner such that it bends in alternating horizontal directions along its length, a configuration that may be achieved by using a blow molding process to form the heat transfer member 60$_b$. The longer gas flow path, the larger heat transfer area, and the curvature-generated secondary flow associated with the heat transfer member 60$_b$ contribute to its higher heat transfer rate.

Figure 8:
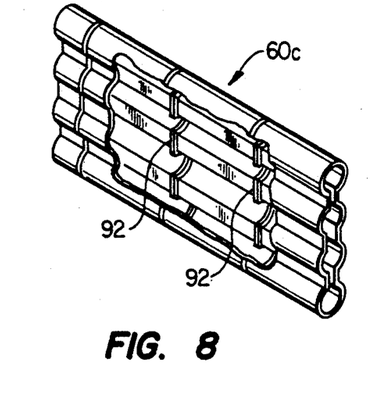
FIG. 8 is a partially cut away fragmentary perspective view of a portion of one of the plastic secondary heat exchanger plates illustrating a third alternate configuration thereof.

A further alternate configuration for the heat transfer members is incorporated in the heat transfer member 60$_c$ shown in FIG. 8 in the form of a longitudinally spaced series of interior peripheral ribs 92 that may be conveniently formed by periodically contracting the processing die extrusion port during the extruding of the member 60$_c$. The interior peripheral ribs 92 serve as heat transfer promoters by breaking up the boundary layer developed on the interior heat transfer member surface, thus reducing the boundary layer thickness and enhancing h (R)at transfer. The heat transfer of the member 60$_c$ is also increased by the turbulence generated by the ribs 92.

Figure 9:
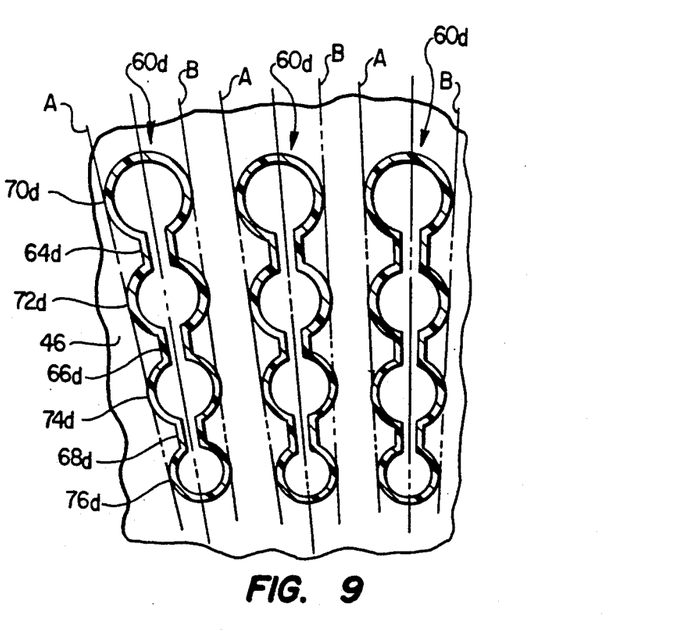
FIG. 9 is a partial cross-sectional view through the hollow plate portions of the secondary heat exchanger, looking toward the inlet collector box, and illustrates a third alternate configuration of the plates.

FIG. 9 cross-sectionally illustrates three alternatively configured heat transfer members 60$_d$ as viewed looking toward the side wall 46 of the inlet collector box 44. As illustrated, the horizontally enlarged second portions of each member progressively decrease in size, from the uppermost portion 70$_d$ to the lowermost portion 76$_d$, in a manner such that a pair of nonparallel reference planes A and B on opposite sides of the member are tangent to the opposite side extremities of the portions 70$_d$–76$_d$.

The heat transfer members 60$_d$ are relatively oriented in a manner such that each facing pair of reference planes A,B on an adjacent pair of heat transfer members 60$_d$ are parallel to one another. Cross-sectionally, this gives the heat transfer members 60$_d$ a generally fan-like orientation. The advantage of this heat transfer configuration and orientation is the increase in the heat transfer area which is directly exposed to the flow of air 36, thus increasing the air-side heat transfer rate of the furnace. This configuration is particularly useful for an air blower opening smaller than the geometry of the heat exchanger, as is often the case in residential furnaces.

Figure 10:
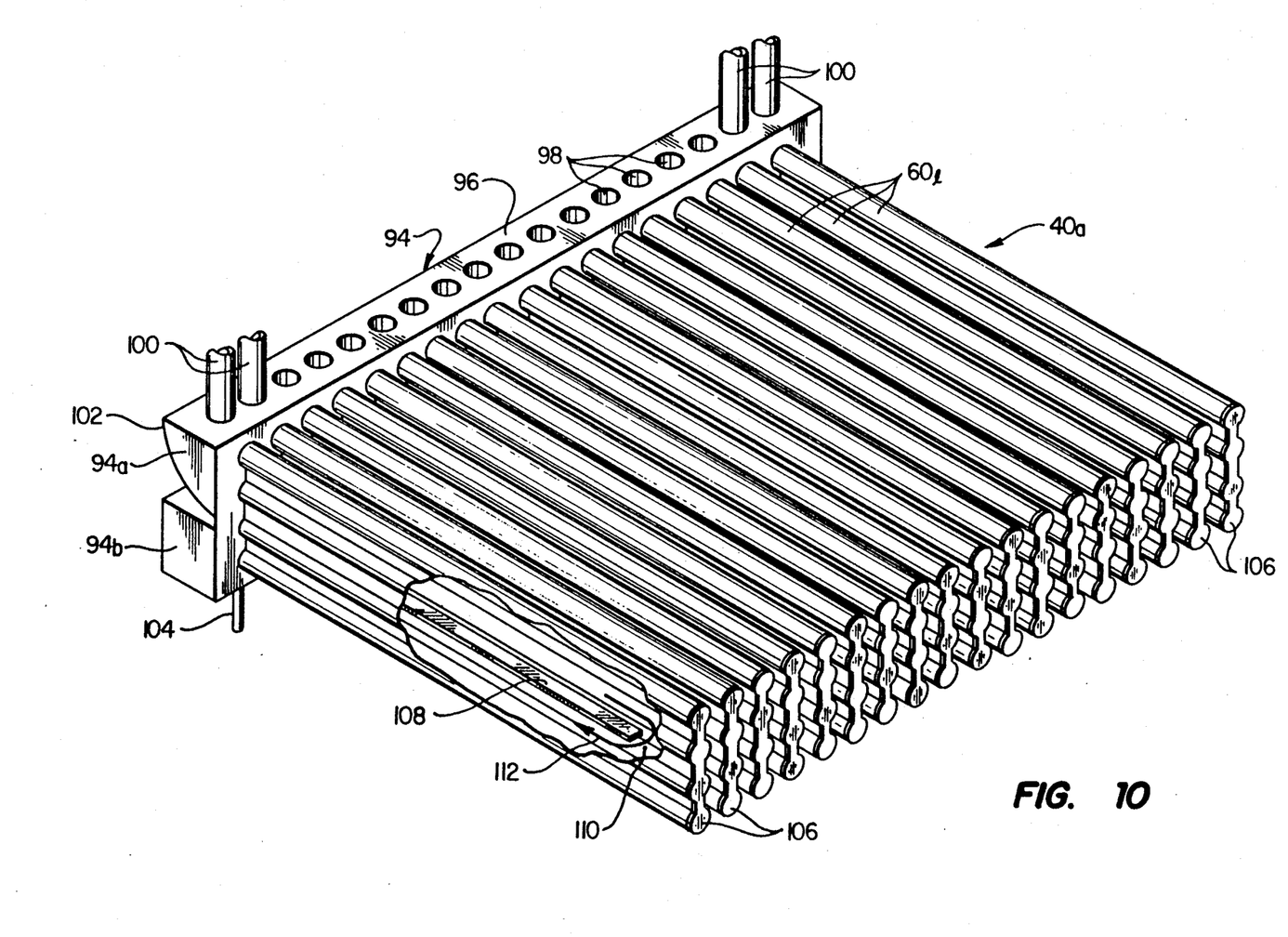
FIG. 10 is a partially cut away perspective view of an alternate embodiment of the plastic secondary heat exchanger.

An alternate embodiment 40$_a$ of the plastic secondary heat exchanger 40 is perspectively illustrated in FIG. 10 and includes a combination inlet/outlet collector box structure 94 having an inlet portion 94$_a$ positioned upwardly adjacent an outlet portion 94$_b$. Inlet portion 94$_a$ has a top wall 96 having a horizontally spaced series of circular openings 98 formed therein for receiving the outlet ends of a series of metal tube portions 100 of a primary heat exchanger similar to the previously described primary heat exchanger 38. An arcuate rear side wall 102 of the inlet portion 94$_a$ facilitates condensate drainage therefrom. The outlet portion 94$_b$ has an outlet (not visible) connectable to the draft inducer fan inlet 30 (FIG. 1), and a condensate line 104 is connected to the underside of the outlet portion 94$_b$.

Left or inner end portions of a horizontally spaced series of elongated hollow plastic heat transfer members 60$_e$ are connected to the inlet/outlet collector box structure 94—upper sections of such inner end portions being sealingly connected to the inlet portion 94$_a$, and lower sections of such inner end portions being sealingly connected to the outlet portion 94$_b$. The right or outer ends of the hollow heat transfer members 60$_e$ are closed by plastic closure plates 106 suitably secured thereto as by ultrasonic welding or an epoxy material.

Each of the heat transfer members 60$_a$ has formed therein a horizontally elongated baffle portion 108 that separates the upper and lower sections of the heat transfer member except along an interior passage portion 110 adjacent the end closure plate 106. Accordingly, during furnace operation, combustion gases 112 discharged from the inlet portion 94$_a$ flow rightwardly through the upper sections of the heat transfer members 60$_e$, downwardly through the passage portions 110, and leftwardly through the lower sections of the heat transfer members 60, into the outlet portion 94$_b$ of the inlet/outlet collector box structure 94. In this manner, the need for a separate collector box structure at the right end of the secondary heat exchanger is eliminated, thereby reducing the cost of the overall recuperative heat exchanger structure.

The foregoing detailed description is to be clearly understood as being given by way of illustration and example only, the spirit and scope of the present invention being limited solely by the appended claims.

What is claimed is:

1. A secondary heat exchanger for a fuel-fired condensing furnace, comprising:

a plastic inlet collector box having inlet openings thereon for receiving combustion gases discharged from a primary heat exchanger;

a plastic outlet collector box spaced apart in a first direction from said inlet collector box and having an outlet for discharging combustion gases; and a series of elongated, extruded plastic heat transfer members laterally spaced apart in a second direction transverse to said first direction and having hollow, generally plate-like configurations with the side edge-to-side edge widths of said heat transfer members being generally oriented in a third direction transverse to said first and second directions, first end portions sealingly connected to said inlet collector box, and second ed portions sealingly connected to said outlet collector box, said heat transfer members being operative to internally flow combustion gases, in single passes therethrough, from the interior of said inlet collector box to the interior of said outlet collector box, the cross-section of each of said heat transfer members being defined along its length by a series of indented first portions mutually spaced apart in said third direction and interdigitated with a series of convexly and outwardly curved second portions, each laterally adjacent pair of said convexly curved second portions having one of said indented first portions positioned therebetween and each of said indented first portions being defined by a spaced apart pair of parallel, flat facing wall sections of the heat transfer member extending from its first end to its second end and between which hot combustion products may flow along the entire length of the heat transfer member, said pairs of parallel, facing flat wall sections serving to materially enhance the convective heat transfer capacity of the heat transfer member.

2. The secondary heat exchanger of claim 1 wherein:
said inlet collector box, said outlet collector box, and said heat transfer members are formed from a polyetherimide plastic material.

3. The secondary heat exchanger of claim 1 wherein:
said inlet and outlet collector boxes are of an injection molded plastic construction.

4. The secondary heat exchanger of claim 1 wherein:

each of said heat transfer members is horizontally bent in alternating opposite directions along its length.

5. A fuel-fired condensing furnace comprising:

a housing having an inlet opening and an outlet opening;

blower means operable to flow air sequentially into said inlet opening, through a vertical flow path within said housing, and then outwardly through said outlet opening;

burner means for receiving a fuel-air mixture and discharging flames and hot products of combustion;

draft inducer fan means having an inlet and being operative to receive and discharge combustion gases generated during operation of said furnace; and a recuperative heat exchanger structure operatively interposed in said vertical flow path and including:

(a) a primary heat exchanger defined by a horizontally spaced series of vertically serpentined metal combustor tubes having inlet ends positioned to receive flames and hot products of combustion discharged from said burner means, and outlet ends for discharging combustion gases, and (b) a secondary heat exchanger disposed beneath said primary heat exchanger and including:

(1) a plastic inlet collector box connected to said outlet ends of said metal combustor tubes to receive combustion gases discharged therefrom, (2) a plastic outlet collector box horizontally spaced apart from said inlet collector box and connected to said draft inducer fan means inlet, and (3) a horizontally spaced series of elongated, extruded plastic heat transfer members having hollow, generally plate-like configurations with the side edge-to-side edge widths of said heat transfer members being generally vertically oriented, and first and second end portions respectively and sealingly connected to said horizontally spaced apart inlet and outlet collector boxes, said heat transfer members being operative to internally flow, in single passes from their first end portions to their second end portions, combustion gases from the interior of said inlet collector box to the interior of said outlet collector box for passage therefrom into the inlet of said draft inducer fan means, the cross-section of each of said heat transfer members being defined along its length by a vertically spaced series of horizontally indented first portions interdigitated with a vertically spaced series of horizontally enlarged, convexly curved second portions, each vertically adjacent pair of said convexly curved second portions having one of said horizontally indented first portions positioned therebetween and each of said horizontally indented first portions being defined by a horizontally spaced apart pair of parallel, flat facing wall sections of the heat transfer member extending from its first end to its second end and between which hot combustion products may flow horizontally along the entire length of the heat transfer member, said pairs of parallel, facing flat wall sections serving to materially enhance the convective heat transfer capacity of the heat transfer member.

6. The fuel-fired condensing furnace of claim 5 wherein:

said inlet collector box, said outlet collector box, and said heat transfer members are formed from a polyetherimide plastic material.

7. The fuel-fired condensing furnace of claim 5 wherein:

said inlet and outlet collector boxes are of an injection molded plastic construction.

8. The fuel-fired condensing furnace of claim 1 wherein:

each of said heat transfer members is horizontally bent in alternating opposite directions along its length.

9. A fuel-fired condensing furnace comprising:

a housing having an inlet opening and an outlet opening;

blower means operable to flow air sequentially into said inlet opening, through a vertical flow path within said housing, and then outwardly through said outlet opening;

burner means for receiving a fuel-air mixture and discharging flames and hot products of combustion;

draft inducer fan means having an inlet and being operative to receive and discharge combustion gases generated during operation of said furnace; and a recuperative heat exchanger structure operatively interposed in said vertical flow path and including:

(a) a primary heat exchanger defined by a horizontally spaced series of vertically serpentined metal combustor tubes having inlet ends positioned to receive flames and hot products of combustion discharged from said burner means, and outlet ends for discharging combustion gases, and (b) a secondary heat exchanger disposed beneath said primary heat exchanger and including:

(1) a plastic inlet collector box connected to said outlet ends of said metal combustor tubes to receive combustion gases discharged therefrom, (2) a plastic outlet collector box horizontally spaced apart from said inlet collector box and connected to said draft inducer fan means inlet, and (3) a horizontally spaced series of elongated, extruded plastic heat transfer members having hollow, generally plate-like configurations with the side edge-to-side edge widths of said heat transfer members being generally vertically oriented, and first and second end portions respectively and sealingly connected to said horizontally spaced apart inlet and outlet collector boxes, said heat transfer members being operative to internally flow, in single passes from their first end portions to their second end portions, combustion gases from the interior of said inlet collector box to the interior of said outlet collector box for passage therefrom into the inlet of said draft inducer fan means, the cross-section of each of said heat transfer members being defined along its length by a vertically spaced series of horizontally indented first portions interdigitated with a vertically spaced series of horizontally enlarged, convexly curved second portions, each vertically adjacent pair of said convexly curved second portions having one of said horizontally indented first portions positioned therebetween and each of said horizontally indented first portions being defined by a horizontally spaced apart pair of parallel, flat facing wall sections of the heat transfer member extending from its first end to its second end and between which hot combustion products may flow horizontally along the entire length of the heat transfer member, said pairs of parallel, facing flat wall sections serving to materially enhance the convective heat transfer capacity of the heat transfer member, each of said heat transfer members having a longitudinally spaced series of inwardly projecting internal peripheral ribs thereon.

10. A fuel-fired condensing furnace comprising:

a housing having an inlet opening and an outlet opening;

blower means operable to flow air sequentially into said inlet opening, through a vertical flow path within said housing, and then outwardly through said outlet opening;

burner means for receiving a fuel-air mixture and discharging flames and hot products of combustion;

draft inducer fan means having an inlet and being operative to receive and discharge combustion gases generated during operation of said furnace; and a recuperative heat exchanger structure operatively interposed in said vertical flow path and including:

(a) a primary heat exchanger defined by a horizontally spaced series of vertically serpentined metal combustor tubes having inlet ends positioned to receive flames and hot products of combustion discharged from said burner means, and outlet ends for discharging combustion gases, and (b) a secondary heat exchanger disposed beneath said primary heat exchanger and including:
 (1) a plastic inlet collector box connected to said outlet ends of said metal combustor tubes to receive combustion gases discharged therefrom,
 (2) a plastic outlet collector box horizontally spaced apart from said inlet collector box and connected to said draft inducer fan means inlet, and
 (3) a horizontally spaced series of elongated, extruded plastic heat transfer members having hollow, generally plate-like configurations with the side edge-to-side edge widths of said heat transfer members being generally vertically oriented, and first and second end portions respectively and sealingly connected to said horizontally spaced apart inlet and outlet collector boxes, said heat transfer members being operative to internally flow, in single passes from their first end portions to their second end portions, combustion gases from the interior of said inlet collector box to the interior of said outlet collector box for passage therefrom into the inlet of said draft inducer fan means, the cross-section of each of said heat transfer members being defined along its length by a vertically spaced series of horizontally indented first portions interdigitated with a vertically spaced series of horizontally enlarged, convexly curved second portions, each vertically adjacent pair of said convexly curved second portions having one of said horizontally indented first portions positioned therebetween and each of said horizontally indented first portions being defined by a horizontally spaced apart pair of parallel, flat facing wall sections of the heat transfer member extending from its first end to its second end and between which hot combustion products may flow horizontally along the entire length of the heat transfer member, said pairs of parallel, facing flat wall sections serving to materially enhance the convective heat transfer capacity of the heat transfer member, each of said pairs of parallel, facing wall sections of said heat transfer members are joined by an internal stiffening rib section extending interiorly along the length of the heat transfer member.

11. A fuel-fired condensing furnace comprising:

a housing having an inlet opening and an outlet opening;

blower means operable to flow air sequentially into said inlet opening, through a vertical flow path within said housing, and then outwardly through said outlet opening;

burner means for receiving a fuel-air mixture and discharging flames and hot products of combustion;

draft inducer fan means having an inlet and being operative to receive and discharge combustion gases generated during operation of said furnace; and a recuperative heat exchanger structure operatively interposed in said vertical flow path and including:

(a) a primary heat exchanger defined by a horizontally spaced series of vertically serpentined metal combustor tubes having inlet ends positioned to receive flames and hot products of combustion discharged from said burner means, and outlet ends for discharging combustion gases, and (b) a secondary heat exchanger disposed beneath said primary heat exchanger and including:
 (1) a plastic inlet collector box connected to said outlet ends of said metal combustor tubes to receive combustion gases discharged therefrom,
 (2) a plastic outlet collector box horizontally spaced apart from said inlet collector box and connected to said draft inducer fan means inlet, and
 (3) a horizontally spaced series of elongated, extruded plastic heat transfer members having hollow, generally plate-like configurations with the side edge-to-side edge widths of said heat transfer members being generally vertically oriented, and first and second end portions respectively and sealingly connected to said horizontally spaced apart inlet and outlet collector boxes, said heat transfer members being operative to internally flow, in single passes from their first end portions to their second end portions, combustion gases from the interior of said inlet collector box to the interior of said outlet collector box for passage therefrom into the inlet of said draft inducer fan means, the cross-section of each of said heat transfer members being defined along its length by a vertically spaced series of horizontally indented first portions interdigitated with a vertically spaced series of horizontally enlarged, convexly curved second portions, each vertically adjacent pair of said convexly curved second portions having one of said horizontally indented first portions positioned therebetween and each of said horizontally indented first portions being defined by a horizontally spaced apart pair of parallel, flat facing wall sections of the heat transfer member extending from its first end to its second end and between which hot combustion products may flow horizontally along the entire length of the heat transfer member, said pairs of parallel, facing flat wall sections serving to materially enhance the convective heat transfer capacity of the heat transfer member, the horizontal width of said second portions of each of said heat transfer members progressively decreasing from the uppermost one to the lowermost one of the second portions in a manner such that nonparallel reference planes on opposite sides of the heat transfer members are generally tangent to the second portions thereof, and the facing reference planes on each adjacent pair of said heat transfer members are generally parallel to one another, whereby said heat transfer members are collectively positioned in a generally fan-like orientation as viewed along their lengths.

12. A fuel-fired condensing furnace comprising:

a housing having an inlet opening and an outlet opening;

blower means operable to flow air sequentially into said inlet opening, through a vertical flow path within said housing, and then outwardly through said outlet opening;

burner means for receiving a fuel-air mixture and discharging flames and hot products of combustion;

draft inducer fan means having an inlet and being operative to receive and discharge combustion gases generated during operation of said furnace; and a recuperative heat exchanger structure operatively interposed in said vertical flow path within said housing and including:

(a) a primary heat exchanger defined by a horizontally spaced series of vertically serpentined metal combustor tubes having inlet ends positioned to receive flames and hot products of combustion discharged from said burner means, and outlet ends for discharging combustion gases, and (b) a secondary heat exchanger disposed beneath said primary heat exchanger and including:
(1) a plastic inlet collector box connected to said outlet ends of said metal combustor tubes to receive combustion gases discharged therefrom,
(2) a plastic outlet collector box connected to said draft inducer fan means inlet, and
(3) a horizontally spaced series of elongated plastic heat transfer members having hollow, generally plate-like configurations with the side edge-to-side edge widths of said heat transfer members being generally vertically oriented, and end portions sealingly connected to said inlet and outlet collector boxes, said heat transfer members being operative to internally flow combustion gases from the interior of said inlet collector box to the interior of said outlet collector box for passage therefrom into the inlet of said draft inducer fan means, said inlet collector box having a side wall with an interior surface in which a horizontally spaced series of downwardly sloping condensate drainage troughs are formed, each of said troughs having a lower end portion aligned with one of said end portions of said heat transfer members and positioned to direct combustion gas condensate from the interior of said inlet collector box into the heat transfer member end portion.

13. The fuel-fired condensing furnace of claim 12 wherein:

the portions of said interior surface are each sloped toward the side of an adjacent trough.

14. A fuel-fired condensing furnace comprising:

a housing having an inlet opening and an outlet opening;

blower means operable to flow air sequentially into said inlet opening, through a vertical flow path within said housing, and then outwardly through said outlet opening;

burner means for receiving a fuel-air mixture and discharging flames and hot products of combustion;

draft inducer fan means having an inlet and being operative to receive and discharge combustion gases generated during operation of said furnace; and a recuperative heat exchanger structure operatively interposed in said vertical flow path and including:

(a) a primary heat exchanger defined by a horizontally spaced series of vertically serpentined metal combustor tubes having inlet ends positioned to receive flames and hot products of combustion discharged from said burner means, and outlet ends for discharging combustion gases, and (b) a secondary heat exchanger disposed beneath said primary heat exchanger and including:
(1) a plastic inlet collector box connected to said outlet ends of said metal combustor tubes to receive combustion gases discharged therefrom,
(2) a plastic outlet collector box horizontally spaced apart from said inlet collector box and connected to said draft inducer fan means inlet, and
(3) a horizontally spaced series of elongated, extruded plastic heat transfer members having hollow, generally plate-like configurations with the side edge-to-side edge widths of said heat transfer members being generally vertically oriented, and first and second end portions respectively and sealingly connected to said horizontally spaced apart inlet and outlet collector boxes, said heat transfer members being operative to internally flow, in single passes from their first end portions to their second end portions, combustion gases from the interior of said inlet collector box to the interior of said outlet collector box for passage therefrom into the inlet of said draft inducer fan means, the cross-section of each of said heat transfer members being defined along its length by a vertically spaced series of horizontally indented first portions interdigitated with a vertically spaced series of horizontally enlarged, convexly curved second portions, each vertically adjacent pair of said convexly curved second portions having one of said horizontally indented first portions positioned therebetween and each of said horizontally indented first portions being defined by a horizontally spaced apart pair of parallel, flat facing wall sections of the heat transfer member extending from its first end to its second end and between which hot combustion products may flow horizontally along the entire length of the heat transfer member, said pairs of parallel, facing flat wall sections serving to materially enhance the convective heat transfer capacity of the heat transfer member, said inlet collector box having a spaced series of outwardly projecting tubular connection portions thereon, and said fuel-fired condensing furnace further comprising means for sealingly and resiliently joining said connections to said outlet ends of said combustor tubes.

15. The fuel-fired condensing furnace of claim 14 wherein:

said combustor tube outlet ends are flared and coaxially receive said connection portions, and said means for sealingly and resiliently joining include annular external peripheral bibs formed on said connection portions, and resilient O-ring seals circumscribing said connection portions outboard of said ribs and compressed by said flared outlet ends of said combustor tubes.

16. The fuel-fired condensing furnace of claim 14 wherein:

said combustor tube outlet ends and said connection portions are positioned in an aligned, end-to-end relationship, and said means for sealingly and resiliently joining include resilient collar members outwardly circumscribing adjacent longitudinal portions of each facing tube end and connection portion pair.

17. A secondary heat exchanger for a fuel-fired condensing furnace, comprising:

a plastic inlet collector box having inlet openings thereon for receiving combustion gases discharged from a primary heat exchanger;

a plastic outlet collector box spaced apart in a first direction from said inlet collector box and having an outlet for discharging combustion gases; and a series of elongated, extruded plastic heat transfer members laterally spaced apart in a second direction transverse to said first direction and having hollow, generally plate-like configurations with the side edge-to-side edge widths of said heat transfer members being generally oriented in a third direction transverse to said first and second directions, first end portions sealingly connected to said inlet collector box, and second end portions sealingly connected to said outlet collector box, said heat transfer members being operative to internally flow combustion gases, in single passes therethrough, from the interior of said inlet collector box to the interior of said outlet collector box, the cross-section of each of said heat transfer members being defined along its length by a series of indented first portions mutually spaced apart in said third direction and interdigitated with a series of convexly and outwardly curved second portions, each laterally adjacent pair of said convexly curved second portions having one of said indented first portions positioned therebetween and each of said indented first portions being defined by a spaced apart pair of a parallel, flat facing wall sections of the heat transfer member extending from its first end to its second end and between which hot combustion products may flow along the entire length of the heat transfer member, said pairs of parallel, facing flat wall sections serving to materially enhance the convective heat transfer capacity of the heat transfer member, each of said heat transfer members having a longitudinally spaced series of inwardly projecting internal peripheral ribs thereon.

18. A secondary heat exchanger for a fuel-fired condensing furnace, comprising:

a plastic inlet collector box having inlet openings thereon for receiving combustion gases discharged from a primary heat exchanger;

a plastic outlet collector box spaced apart in a first direction from said inlet collector box and having an outlet for discharging combustion gases; and a series of elongated, extruded plastic heat transfer members laterally spaced apart in a second direction transverse to said first direction and having hollow, generally plate-like configurations with the side edge-to-side edge widths of said heat transfer members being generally oriented in a third direction transverse to said first and second directions, first end portions sealingly connected to said inlet collector box, and second end portions sealingly connected to said outlet collector box, said heat transfer members being operative to internally flow combustion gases, in single passes therethrough, from the interior of said inlet collector box to the interior of said outlet collector box, the cross-section of each of said heat transfer members being defined along its length by a series of indented first portions mutually spaced apart in said third direction and interdigitated with a series of convexly and outwardly curved second portions, each laterally adjacent pair of said convexly curved second portions having one of said indented first portions positioned therebetween and each of said indented first portions being defined by a spaced apart pair of parallel, flat facing wall sections of the heat transfer member extending from its first end to its second end and between which hot combustion products may flow along the entire length of the heat transfer member, said pairs of parallel, facing flat wall sections serving to materially enhance the convective heat transfer capacity of the heat transfer member, each of said pairs of parallel, facing wall sections of said heat transfer members being joined by an internal stiffening rib section extending interiorly along the length of the heat transfer member.

19. A secondary heat exchanger for a fuel-fired condensing furnace, comprising:

a plastic inlet collector box having inlet openings thereon for receiving combustion gases discharged from a primary heat exchanger;

a plastic outlet collector box spaced apart in a first direction from said inlet collector box and having an outlet for discharging combustion gases; and a series of elongated, extruded plastic heat transfer members laterally spaced apart in a second direction transverse to said first direction and having hollow, generally plate-like configurations with the side edge-to-side edge widths of said heat transfer members being generally oriented in a third direction transverse to said first and second directions, first end portions sealingly connected to said inlet collector box, and second end portions sealingly connected to said outlet collector box, said heat transfer members being operative to internally flow combustion gases, in single passes therethrough, from the interior of said inlet collector box to the interior of said outlet collector box, the cross-section of each of said heat transfer members being defined along its length by a series of indented first portions mutually spaced apart in said third direction and interdigitated with a series of convexly and outwardly curved second portions, each laterally adjacent pair of said convexly curved second portions having one of said indented first portions positioned therebetween and each of said indented first portions being defined by a spaced apart pair of parallel, flat facing wall sections of the heat transfer member extending from its first end to its second end and between which hot combustion products may flow along the entire length of the heat transfer member, said pairs of parallel, facing flat wall sections serving to materially enhance the convective heat transfer capacity of the heat transfer member, the width, in said second direction, of said second portions of each of said heat transfer members progressively decreasing from the second portions adjacent one side edge of its heat transfer member to the opposite side edge of its heat transfer member in a manner such that nonparallel reference planes on the opposite sides of the heat transfer members are generally tangent of the second portions thereof, and the facing reference planes on each adjacent pair of said heat transfer members are generally parallel to one another, whereby said heat transfer members are collectively positioned in a generally fan-like orientation as viewed along their lengths.

20. A secondary heat exchanger for a fuel-fired condensing furnace, comprising:
a plastic inlet collector box having inlet openings thereon for receiving combustion gases discharged from a primary heat exchanger;
a plastic outlet collector box spaced apart in a first direction from said inlet collector box and having an outlet for discharging combustion gases; and
a series of elongated plastic heat transfer members laterally spaced apart in a second direction transverse to said first direction and having hollow, generally plate-like configurations with the side edge-to-edge widths of said heat transfer members being generally oriented in a third direction transverse to said first and second directions, first end portions sealingly connected to said inlet collector box, and second end portions sealingly connected to said outlet collector box, said heat transfer members being operative to internally flow combustion gases from the interior of said inlet collector box to the interior of said outlet collector box, the cross-sections of said heat transfer members being defined along their lengths by a series of indented first portions interdigitated with a spaced series of outwardly enlarged, convexly curved second portions,
said inlet collector box having a side wall with an interior surface in which a spaced series of sloping condensate drainage troughs are formed, each of said troughs having an end portion aligned with one of said end portions of said heat transfer members and positionable to drain combustion gas condensate from the interior of said inlet collector box into the heat transfer member end portion.

21. The secondary heat exchanger of claim 20 wherein:
the portions of said interior surface are each sloped toward the side of an adjacent trough.

22. A secondary heat exchanger for a fuel-fired condensing furnace, comprising:
a plastic inlet collector box having inlet openings thereon for receiving combustion gases discharged from a primary heat exchanger;
a plastic outlet collector box generally aligned along a first direction with said inlet collector box and having an outlet for discharging combustion gases; and
a series of elongated extruded plastic heat transfer members laterally spaced apart in a second direction transverse to said first direction and having hollow, generally plate-like configurations with the side edge-to-side edge widths of said heat transfer members being generally oriented in said first direction, the cross-sections of said heat transfer members being defined along their lengths by a series of indented first portions spaced apart in said first direction and interdigitated with a series of outwardly enlarged, convexly curved second portions, each laterally adjacent pair of said convexly curved second portions having one of said indented first portions positioned therebetween and each of said indented first portions being defined by a pair of parallel, spaced apart flat facing wall sections of the heat transfer member extending between its opposite ends and between which hot combustion products may flow along essentially the entire length of the heat transfer member, each of said heat transfer members having a closed outer end, a first widthwise section with an inner end portion sealingly connected to said inlet collector box, a second widthwise section with an inner end portion sealingly connected to said outlet collector box, and an elongated interior baffle portion longitudinally extending in said first direction and separating said first and second widthwise sections, along a major portion of their lengths, in a manner such that combustion gases operatively traversing said secondary heat exchanger sequentially enter said inlet collector box, flow through said first widthwise sections of said heat transfer members toward said closed outer ends thereof, pass into said second widthwise sections of said heat transfer members adjacent said closed outer ends thereof, and then flow through said second widthwise sections of said heat transfer members into said outlet collector box.

23. The secondary heat exchanger of claim 22 wherein:
said inlet collector box, said outlet collector box, and said heat transfer members are formed from a polyetherimide plastic material.

24. The secondary heat exchanger of claim 22 wherein:
said inlet and outlet collector boxes are of an injection molded plastic construction.

* * * * *

UNITED STATES PATENT AND TRADEMARK OFFICE
CERTIFICATE OF CORRECTION

PATENT NO. : 5,178,124
DATED : January 12, 1993
INVENTOR(S) : Lin-Tao Lu, et al.

It is certified that error appears in the above-identified patent and that said Letters Patent is hereby corrected as shown below:

In the Abstract, "second" should read --secondary--.

Column 1, line 33, "Of" should be --of--.

Column 3, line 21, "Outlet" should be --outlet--.

Column 3, line 45, "Outlet" should be --outlet--.

Column 5, line 11, "illlustrating" should be --illustrating--.

Column 5, line 37, "Of" should be --of--.

Column 9, line 19, "h®at" should read --heat--.

Column 10, line 11, "60," should be --$60_e$--.

Column 10, line 38, "ed" should be --end--.

Signed and Sealed this

Twelfth Day of April, 1994

*Attest:*

BRUCE LEHMAN

*Attesting Officer*

*Commissioner of Patents and Trademarks*